United States Patent Office 2,725,677
Patented Dec. 6, 1955

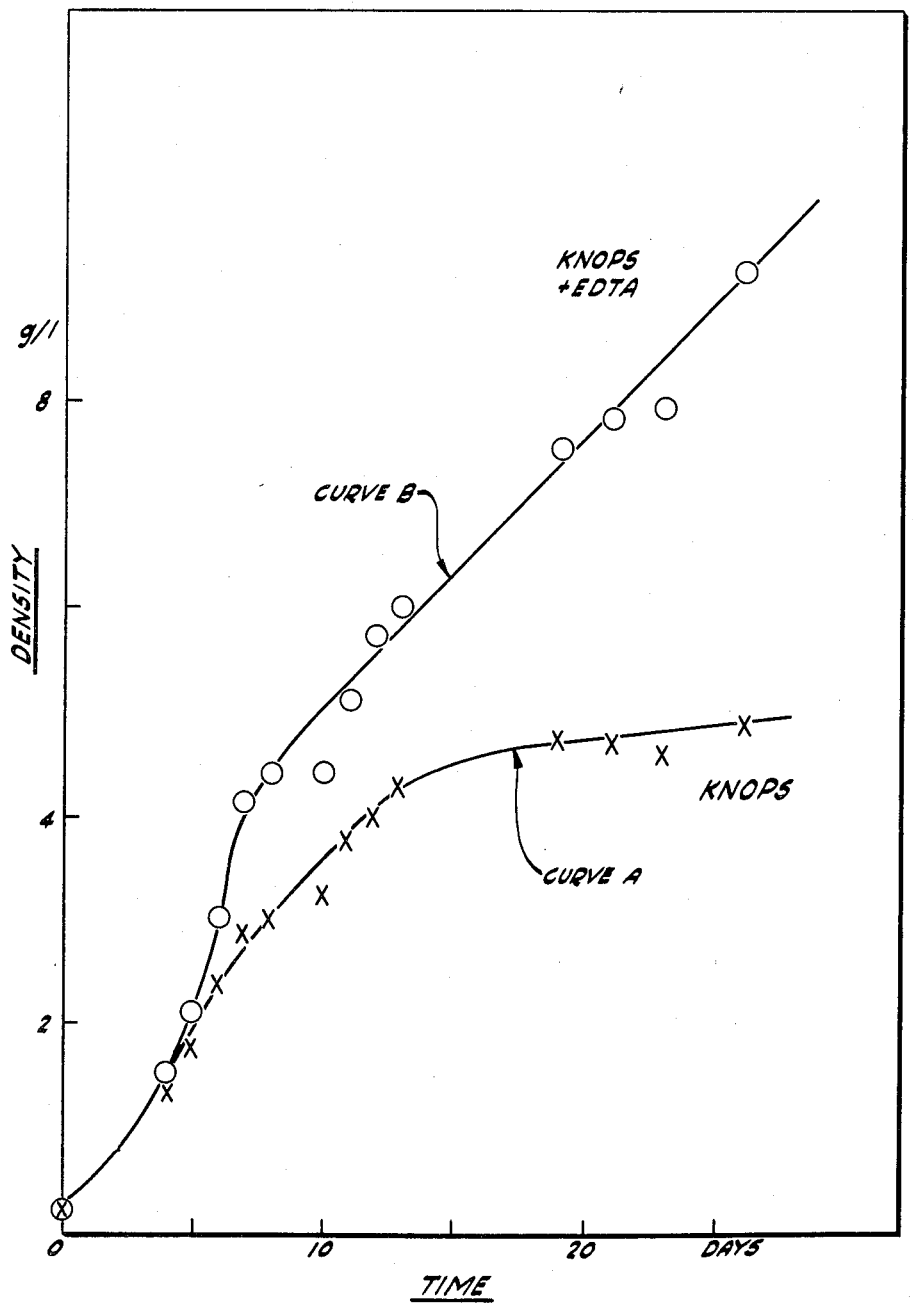

2,725,677

METHOD OF EFFECTUATING HIGH DENSITY MASS CULTURE OF ALGAE OR OTHER MICROORGANISMS

Jack Edgar Myers, Austin, Tex., assignor to Carnegie Institution of Washington, Washington, D. C., a corporation Application January 16, 1952, Serial No. 266,757

6 Claims. (Cl. 47—58)

My invention relates to the culture of microorganisms, particularly algae, more especially as represented by *Chlorella pyrenoidosa* and has to do especially with the mass culture as exemplified in the copending application of Myers and Phillips, Serial Number 202,294, filed December 22, 1950, entitled "Mass Culture of Algae," and the copending application of Cook, Serial Number 203,429, filed December 22, 1950, now Patent 2,658,310, and entitled "Apparatus and Process for the Production of Photosynthetic Microorganisms, Particularly Algae."

While the laboratory or small scale culture of various microorganisms, particularly algae, has been carried on for a number of years under special, sterile conditions, it has developed in recent years that very large scale culture of algae is desirable. In large scale culture it is necessary to sacrifice some of the features or factors readily controlled in the laboratory. One of the important sacrifices that apparently must be made is the elimination of generally sterile conditions and to permit and to carry on the propagation or culture or growth of the microorganisms desired in the presence of other microorganisms or molds or spores or bacteria normally looked upon as contaminants. Foreign microorganisms, referred to generally as contaminants, apparently can be tolerated in mass culture without deleterious effect upon the particular microorganisms being cultured, provided the culture practice is appropriately conducted.

It is therefore an object of my invention to effectuate a high density mass culture of microorganisms such as algae even under non-sterile conditions.

Another object of the invention is to provide a method for mass culture of algae at relatively high density.

A still further object of the invention is in general to improve mass algae or microorganism culture.

A still further object of the invention is to carry on the mass culture of Chlorella in non-sterile high density conditions.

Other objects, together with the foregoing, are attained in the practice of my method pursuant to the detailed description thereof which follows. Reference is also made to the drawing in which The figure is a graph showing growth rate curves or density of growth against time.

The results of the operation of the method of my invention are represented in part by the drawing which is a graph showing the relative weights and densities of growth of a microorganism when cultured in accordance with usual practice and when cultured in accordance with the disclosure herein.

While the method of my invention is believed to be generally effective in connection with microorganisms and particularly in connection with algae, it has been applied most often in connection with the mass culture of the alga, *Chlorella pyrenoidosa* referred to herein as Chlorella and utilized primarily as an example.

Of the considerable body of literature variously concerned with the culture of algae, there is relatively little work directed toward the particular problems of mass culture. H. von Witsch (Arch. f. Mikrobiologie, 14, 128 (1947), and Biologischen Zent., 67, 95 (1948)), grew Chlorella in vertical glass cylinders of three centimeters diameter and studied effects of carbon dioxide provision and the composition of the medium on yield and rate of growth. He achieved yields which approached the following as maxima: 5.0 gm. dry weight per liter in 20 days: 6.68 gm. dry weight per liter in 38 days (figures from different experiments). Spoehr and co-workers (Spoehr, Smith, Strain, Milner and Hardin, "Fatty Acid Antibacterials From Plants," Carnegie Institution of Washington, publication No. 586 (1949)), produced 10.69 kg. of dry Chlorella from 590 cultures grown in five gallon carboys under daylight illumination in a greenhouse. The cultures were harvested at thirty to fifty days; the maximum yield achieved was about 4.0 gm. dry weight per liter. No attempt was made to investigate the factors limiting growth rate or yield. Ketchum, Lillick, and Redfield (J. Cell. and Comp. Physiol., 33,267 (1949)), studied growth and optimum yield in cultures illuminated by a jacketed neon tube immersed in 8 liters of media contained in a Pyrex bottle. Of a number of different unicellular algae examined, *Chlorella pyrenoidosa* gave the highest density and daily yield; namely, 0.74 gm. per liter maximum density and 0.065 gm. per liter per day maximum growth rate.

As set forth in the above mentioned copending applications, this work has been continued to provide for the culture of algae, particularly Chlorella, in vastly larger quantities with new problems arising due to the different scale of the undertaking and due somewhat to the different problems encountered in large masses of high density microorganisms. The mechanisms and methods of the mentioned applications are in some respects of an engineering caliber but there are still problems which are essentially biological. The rates of growth obtained in the published work cited above are lower by at least several orders of magnitude than the maximum growth rate of Chlorella which is about a sevenfold increase per day. Many experiments, including those mentioned above and including some made with the apparatus of the copending applications, have varied numerous factors to determine optimum conditions of growth and have had to do primarily with the design of growth chamber. A difference immediately manifests itself when the scale of the growth chamber is shifted from a laboratory size to a practical engineering size. While it is feasible and possible to sterilize laboratory apparatus, it is virtually impossible to operate an engineering size apparatus under sterile conditions.

It is noted in general that following the customary practice, the rate of growth of the microorganism in the culture chambers when treated in the ordinary way is as shown by curve A in the figure. This indicates that the growth is approximately of a straight line nature with a constant increase in density with time over the initial period of growth of the culture. For example, a density of 2 gm. per liter is attained after about 5 days' time whereas a density of 4 gms. per liter is attained after about 12 days' culture. At that time it is observed that the rate of increase in density of the culture in units of grams per liter falls off very markedly and while the total quantity of microorganisms produced increases, the rate of density increase falls off to practically nothing so that after about 15 to 20 days the density does not increase substantially and certainly not at the previous rate.

The initial part of the growth curve from 0 days to say 12 days as indicated by the curve A is substantially linear. The latter part of the growth curve A while perhaps linear is at a much slower rate.

Obviously it is desirable in mass culture to have the rate of density increase maintain itself at a large value over a long period of time.

In investigating the reasons for the linearity of the growth rate whether at a rapid rate or at a less rapid rate, consideration must be given to the various growing conditions. One of these is the mineral nutrition of the microorganism. Nutrition includes the furnishing of elements which are utilized in relatively large amounts (macroelements) and those which are utilized in relatively small or trace amounts (microelements). A conventional medium for the culture of Chlorella is Knop's solution. The formula and a convenient method of preparation by means of stock solutions is given in the following Table I.

MACROELEMENTS OF KNOP'S SOLUTION

| Salt | Mol. Wt. | Stock solution | | Final Medium | |
|---|---|---|---|---|---|
| | | Conc., gm./l. | Use, ml./l. | Conc., gm./l. | Molarity |
| $MgSO_4.7H_2O$ | 246.5 | 50.0 | 50 | 2.50 | 0.0103 |
| $KNO_3$ | 101.1 | 25.0 | 50 | 1.25 | 0.0124 |
| $KH_2PO_4$ | 136.1 | 25.0 | 50 | 1.25 | 0.0092 |

The use of $KH_2PO_4$ establishes a pH of about 4.5. Chlorella is not particularly sensitive and will grow in the range of pH 4 to pH 9. Accompanying nitrate uptake during growth there occurs an increase in pH. At initial pH 4.5 the phosphate system is poorly buffered and permits a rapid rise in pH. It is therefore considered more desirable to establish an initial pH at 6.6 to 6.8 to take advantage of the maximum buffer capacity. Relatively wide ranges in the macroelements given above are permissible.

In addition to the macroelements considered in Table I, traces of a number of other elements must be provided. These microelements, known to include iron, manganese, and zinc for Chlorella, have been provided conventionally by shotgun procedure. The microelement combination developed for higher plant nutrition and designated $A_5$ by Arnon (Am. J. Bot., 25,322 (1938)) has been utilized. An appropriate provision of the microelements is indicated by the following table.

*Table II*

SCHEDULE A.—MICROELEMENTS OF THE $A_5$ SOLUTION OF ARNON (1938)

The following salts are dissolved in dilute $H_2SO_4$ to give a single stock solution:

| Salt | Mol. wt. | Stock Conc., gm./l. | A dilution of 1:1000 gives the following final concentrations | |
|---|---|---|---|---|
| | | | $M \times 10^{-6}$ | Elemental p. p. m. |
| $H_3BO_3$ | 61.84 | 2.86 | 46.2 | 0.5 |
| $MnCl_2.4H_2O$ | 197.9 | 1.81 | 9.1 | 0.5 |
| $ZnSO_4.7H_2O$ | 287.6 | 0.222 | 0.78 | 0.05 |
| $CuSO_4.5H_2O$ | 249.7 | 0.079 | 0.32 | 0.02 |
| $MoO_3(85\%)$ | 144. | 0.0177 | 0.12 | 0.01 |

Per liter of final Knop's medium use 1.0 ml. of the above Schedule A and 1.0 ml. stock iron which is as follows:

SCHEDULE B.—STOCK SOLUTION OF IRON IN DILUTE $H_2SO_4$

| | | | | |
|---|---|---|---|---|
| $Fe_2(SO_4)_3$ | 400/2 | 4.0 | 20.0 | 1.12 |

At pH 4.5 to 6.8 this provides an apparently stable solution. It is likely that microelements so provided do not remain in a form available to the algae, at least at pH 6.8.

It is believed that even though the culture medium may remain optically clear, the microelements may not become available or may become unavailable unless a chelating agent is added. This has been demonstrated by the provision first of a freshly prepared Knop's solution at pH 6.8 in accordance with Table I, which is provided with iron and Arnon's $A_5$ microelements according to Schedules A and B, Table II. This supports logarithmic growth of Chlorella up to an optical density of 0.9. An identical solution, one week after preparation, will support logarithmic growth only up to an optical density of 0.65. After three weeks beyond preparation, growth is supported logarithmically only up to an optical density of 0.40. It appears that iron or others of the microelements carried as impurities in the iron salt used or otherwise may possibly form a colloidal phosphate or hydroxide complex which is only sluggishly reversible.

But the microelements can be stabilized and maintained indefinitely in available form if citrate is added as a chelating agent. That is, per liter of Knop's medium, according to Table I, there is added sodium citrate to give a final concentration of $560 \times 10^{-6}$ molar citrate, 1.0 ml. of Arnon's $A_5$ solution, Table II, Schedule A and 1.0 ml. of stock iron according to Table II, Schedule B. The citrate is metabolized only very slowly by Chlorella but unfortunately is attacked by many other microorganisms. Such attack does not occur when the culture is maintained under sterile conditions, but under mass culture conditions in large quantities where sterile conditions cannot be maintained easily or at all, the citrate is so heavily attacked that it is virtually useless and does not serve therefore substantially as a chelating agent under mass culture or non-sterile conditions. It is only suited apparently to growth of cultures under culture conditions when foreign organisms are not present.

While importance is therefore placed on the use of a chelating agent to maintain availability of microelements, under conditions of non-sterile culture the chelating agents normally thought of, such as citric acid and tartaric acid are so rapidly destroyed by other contaminants such as yeasts or bacteria that they are virtually ineffective.

It has therefore been determined, in accordance with the invention that, under mass culture conditions where sterile surroundings cannot be assured, the biologically inert chelating agents, for example ethylene diamine tetraacetic acid hereinafter referred to as EDTA, is useful. EDTA serves well for mass culture at high density and is effective with Chlorella at a pH of 6.8 although it appears to be toxic at pH 4.5.

In utilizing or providing microelements with EDTA as a chelating agent, the procedure is to dissolve 0.50 gram of purified EDTA in 800 ml. of boiling water and which is then permitted to cool. To this are added stock solutions of the macroelements in accordance with Table I. To this are added 10 ml. each of the following stock solutions. The medium is then made up to 1000 ml. and the pH adjusted by addition of KOH as desired.

*Table III*

MICROELEMENTS WITH EDTA AS A CHELATING AGENT

Dissolve 0.50 gm. purified ethylene diamine tetra acetic acid (EDTA) in 800 ml. of boiling water. Cool. Add stock solutions of the macroelements (Table I). Add 10 ml. each of the following stock solutions. The medium is then made up to 1000 ml. and the pH adjusted by addition of KOH as desired.

| Stock Designation | Salt | Mol. wt. | Stock Conc., gm./l. | Dilution 1:100 gives Conc. | |
|---|---|---|---|---|---|
| | | | | $M \times 10^{-6}$ | Elemental p. p. m. |
| Ca | $CaCl_2$ | 111 | 8.35 | 750 | 30 |
| B | $H_3BO_3$ | 61.8 | 11.42 | 1,850 | 20 |
| H-Fe* | $FeSO_4.7H_2O$ | 278 | 4.98 | 179 | 10 |
| | $ZnSO_4.7H_2O$ | 288 | 8.82 | 306 | 20 |
| | $MnCl_2.4H_2O$ | 198 | 1.44 | 73 | 4 |
| $H_5$* | $MoO_3$ | 144 | 0.71 | 42 | 4 |
| | $CuSO_4.5H_2O$ | 250 | 1.57 | 63 | 4 |
| | $Co(NO_3)_2.6H_2O$ | 291 | .49 | 17 | 1 |

*The $H_5$ and H-Fe are stable in dilute acid.

With reference to the linear growth rate, it appears that if a cell population becomes depleted of any essential catalyst, then the growth rate might become limited by the amount of this catalyst even though it is continually divided up among more and more cells. Such a condition is possible in algae cultures since the pH rises and the availability of iron and other trace elements decreases. Also, the relatively high growth rate noted in the above mentioned copending applications is still only of the order of one-tenth the maximum rate of growth of Chlorella.

It is considered that iron or other microelements may become the limiting factors even though initially provided in adequate amounts. The biologically inert chelating agent EDTA was therefore tested in mass culture conditions under daylight illumination in a greenhouse comparable to the conditions of the culture shown in curve A. In one of two parallel cultures, EDTA was added to the Knop's solution with microelements according to Table III. The other culture received microelements only according to Schedules A and B of Table II. The results of the experiment are shown in curve B of the figure. It is clear that EDTA increases the density to which a population can be carried and that without it some factor, associated with the availability of microelements, soon becomes severely limiting.

It is a serious problem to provide adequate amounts of the various microelements and to maintain their availability without exceeding the limits of toxicity. That is, as the density of the culture increases, the demand for microelements also increases. If, however, the quantities of microelements in the medium are increased to satisfy the demand of a high final density, then the concentrations of certain of these microelements become so high as to be toxic under starting or early conditions of a culture. This difficulty may be circumvented by the use of an agent which will chelate certain of the heavy metals of the microelements. The easily reversible chelate complex provides a buffer system that maintains ionic concentrations at a desirable level throughout the life of a culture. This makes it possible at the beginning of a culture to have present relatively large total quantities of microelements which would otherwise be toxic but which are in effect inhibited by the chelating agent, such as EDTA. Yet, the microelements are made available to the relatively low density starting organisms in adequate amounts but only in such amounts as to be non-toxic. As the density of the culture increases, the chelating agent, such as EDTA, continues to operate since it is immune to the various bacterial and other contaminants present. In effect, the supply of microelements is released in accordance with the optimum requirement of the microorganism, such as Chlorella, so that as illustrated by curve B in the figure, not only is the initial rate of growth after the first few days considerably greater, but the highest density of something under 5 gm. per liter attained without the chelating agent is far exceeded after only about six or seven days. At twenty-five days, for example, whereas the culture otherwise identical but without the chelating agent has a density of only about four and three quarters grams per liter, the density of the culture including EDTA is approximately nine grams per liter or almost double. Furthermore, the slope of the curve B does not appear to fall off and indicates that the maximum density has not even yet been attained.

I have therefore provided in accordance with my invention a method of culturing microorganisms such as algae, particularly *Chlorella pyrenoidosa*, in a non-sterile, gross, or large-mass fashion to a high density by using substantially ordinary medium plus a biologically inert chelating agent such as EDTA, having the special property of preventing large quantities of microelements (otherwise toxic in the initial, low density medium) from killing the microorganisms and having the ability of releasing the microelements or making them available in the proper quantities over an extended period, during which the increase in density of the culture is substantially at a high uniform rate. The chelating agent is compatible and useful over long periods since it is not attacked by the contaminants present in the mass culture system.

What is claimed is:

1. A method of effectuating high density mass culture of algae comprising providing a non-sterile nutrient medium having biological contaminants therein, providing said medium with algae, providing in said medium trace elements in a quantity that normally is toxic to the algae at their particular density in the medium, and providing a chelating agent in said medium, said agent having the properties of rendering said quantity of trace elements non-toxic to the algae at their particular density in the medium and being substantially inert as to said contaminants in said non-sterile medium.

2. A method of growing photosynthetic microorganisms in a non-sterile nutrient medium containing biological contaminants and containing microelements in an amount toxic to said microorganisms comprising adding a biologically inert chelating agent to said medium effective to make only a non-toxic amount of said microelements available to said algae.

3. A method of effectuating high density mass culture of algae comprising providing a non-sterile nutrient medium including biological contaminants, providing said medium with algae at a known density, providing said non-sterile medium with EDTA as a chelating agent, and providing said medium with trace elements in a quantity toxic to said algae at said known density in the absence of said EDTA as a chelating agent.

4. A method of effectuating high density mass culture of Chlorella comprising providing a nutrient medium, providing said medium with Chlorella at a known density, providing said medium with EDTA, and providing said medium with trace elements in a quantity toxic to Chlorella at said known density in the absence of EDTA.

5. A method of effectuating high density mass culture of Chlorella in a nutrient medium containing a toxic quantity of trace elements comprising adding EDTA to said medium.

6. A method of effectuating high density mass culture of algae in a non-sterile nutrient medium containing contaminants deleterious to chelating agents such as sodium citrate and containing a toxic quantity of trace elements comprising adding EDTA to said medium.

References Cited in the file of this patent

Pratt et al.: "Studies on Chlorella Vulgaris II." Am. J. Botany, vol. 27, pp. 431–435 (June 1940).

Hunter et al.; Proc. Am. Phil. Soc., vol. 94, No. 2, pp. 152–170 (Apr. 21, 1950).